(12) United States Patent
Zheng et al.

(10) Patent No.: US 11,087,092 B2
(45) Date of Patent: Aug. 10, 2021

(54) AGENT PERSONA GROUNDED CHIT-CHAT GENERATION FRAMEWORK

(71) Applicant: salesforce.com, inc., San Francisco, CA (US)

(72) Inventors: Stephan Zheng, Redwood City, CA (US); Wojciech Kryscinski, Palo Alto, CA (US); Michael Shum, Sunnyvale, CA (US); Richard Socher, Menlo Park, CA (US); Caiming Xiong, Mountain View, CA (US)

(73) Assignee: salesforce.com, inc., San Francisco, CA (US)

(*) Notice: Subject to any disclaimer, the term of this patent is extended or adjusted under 35 U.S.C. 154(b) by 169 days.

(21) Appl. No.: 16/399,871

(22) Filed: Apr. 30, 2019

(65) Prior Publication Data

US 2020/0285705 A1   Sep. 10, 2020

Related U.S. Application Data

(60) Provisional application No. 62/814,192, filed on Mar. 5, 2019.

(51) Int. Cl.
*G06F 40/30* (2020.01)
*G06N 3/08* (2006.01)
*G06F 40/205* (2020.01)

(52) U.S. Cl.
CPC ............ *G06F 40/30* (2020.01); *G06N 3/08* (2013.01); *G06F 40/205* (2020.01)

(58) Field of Classification Search
CPC .... G06F 17/2785; G06F 17/2705; G06N 3/08
See application file for complete search history.

(56) References Cited

U.S. PATENT DOCUMENTS

| | | | |
|---|---|---|---|
| 10,282,663 | B2 | 5/2019 | Socher et al. |
| 10,346,721 | B2 | 7/2019 | Albright et al. |
| 2016/0350653 | A1 | 12/2016 | Socher et al. |
| 2017/0024645 | A1 | 1/2017 | Socher et al. |
| 2017/0032280 | A1 | 2/2017 | Socher |

(Continued)

OTHER PUBLICATIONS

Bahdanau et al., "Neural Machine Translation by Jointly Learning to Align and Translate," International Conference of Learning Representations (ICLR), 2014, pp. 1-15.

(Continued)

*Primary Examiner* — Kevin Ky
(74) *Attorney, Agent, or Firm* — Haynes and Boone, LLP

(57) ABSTRACT

Approaches for determining a response for an agent in an undirected dialogue are provided. The approaches include a dialogue generating framework comprising an encoder neural network, a decoder neural network, and a language model neural network. The dialogue generating framework generates a sketch sentence response with at least one slot. The sketch sentence response is generated word by word and takes into account the undirected dialogue and agent traits of the agent making the response. The dialogue generating framework generates sentence responses by filling the slot with words from the agent traits. The dialogue generating framework ranks the sentence responses according to perplexity by passing the sentence responses through a language model and selects a final response which is a sentence response that has a lowest perplexity.

20 Claims, 7 Drawing Sheets

(56) References Cited

U.S. PATENT DOCUMENTS

| | | |
|---|---|---|
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1 | 10/2018 | Paulus |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0357286 A1* | 12/2018 | Wang .............. G06F 16/24578 |
| 2018/0373682 A1 | 12/2018 | McCann et al. |
| 2018/0373987 A1 | 12/2018 | Zhang et al. |
| 2019/0114540 A1* | 4/2019 | Lee .......................... G10L 15/16 |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258901 A1 | 8/2019 | Albright et al. |
| 2019/0258939 A1 | 8/2019 | Min et al. |
| 2019/0286073 A1 | 9/2019 | Asl et al. |
| 2019/0295530 A1 | 9/2019 | Asl et al. |
| 2019/0354594 A1* | 11/2019 | Foster ..................... G06F 40/35 |

OTHER PUBLICATIONS

Bordes et al., "Learning End-to-End Goal-Oriented Dialog," International Conference of Learning Representations (ICLR), 2016, pp. 1-15.

Chen et al., "A Survey on Dialogue Systems: Recent Advances and New Frontiers," ACM SIGKDD Explorations Newsletter, 2017, pp. 25-35.

Cho et al., "Learning Phrase Representations using RNN Encoder-Decoder for Statistical Machine Translation," arXiv:1406.1078, 2014, pp. 1-15.

Devlin et al., "Bert: Pre-Training of Deep Bidirectional Transformers for Language Understanding," NAACL., 2018, pp. 1-16.

Dinan et al., "The Second Conversational Intelligence Challenge (ConvAI2)," arXiv:1902.00098, 2019, pp. 1-22.

Dinan et al., "Wizard of Wikipedia: Knowledge-Powered Conversational agents," arXiv preprint arXiv:1811.01241, 2018.

Elman, "Finding Structure in Time," Cognitive Science, 1990, pp. 179-211.

Gao et al., "Neural Approaches to Conversational ai," Foundations and Trends (Registered) in Information Retrieval, 2019, pp. 127-298.

Ghazvininejad et al., "A Knowledge-Grounded Neural Conversation Model," The Thirty-Second AAAI Conference on Artificial Intelligence (AAAI-18), 2018, pp. 5110-5117.

Hochreiter et al., "Long Short-Term Memory," Neural Computation, 1997, pp. 1735-1780.

Jurafsky et al., "Speech and Language Processing: An Introduction to Natural Language Processing, Computational Linguistics, and Speech Recognition," 2nd Edition, Prentice Hall Series in Artificial Intelligence, Prentice Hall, Pearson Education International, 2009, pp. 1-17.

Kumar et al., "Ask Me Anything: Dynamic Memory Networks for Natural Language Processing," International Conference on Machine Learning, 2016, pp. 1378-1387.

Li et al., "A Persona-Based Neural Conversation Model," arXiv preprint arXiv:1603.06155, 2016, pp. 1-10.

Pennington et al., "Glove: Global Vectors for Word Representation," In Proceedings of the 2014 Conference on Empirical Methods in Natural Language Processing (EMNLP), 2014, pp. 1532-1543.

Qian et al., "Assigning Personality/Identity to a Chatting Machine for Coherent Conversation Generation," 2017, pp. 1-10.

Radford et al., "Improving Language Understanding by Generative Pre-Training," Preprint, 2018, pp. 1-12.

Serban et al., "A Hierarchical Latent Variable Encoder-Decoder Model for Generating Dialogues," In Thirty-First AAAI Conference on Artificial Intelligence, 2017, pp. 3295-3301.

Serban et al., "Generative Deep Neural Networks for Dialogue: A Short Review," 30th Conference on Neural Information Processing Systems (NIPS 2016), 2016, pp. 1-6.

Sordoni et al., "A Neural Network Approach to Context-Sensitive Generation of Conversational Responses," Proceedings of the 2015 Conference of the North American Chapter of the Association for Computational Linguistics: Human Language Technologies, 2015, pp. 196-205.

Sutskever et al., "Sequence to Sequence Learning With Neural Networks," In Advances in Neural Information Processing Systems, 2014, pp. 3104-3112.

Vaswani et al., "Attention Is All You Need," In Advances in Neural Information Processing Systems, 2017, pp. 5998-6008.

Vinyals et al., "A Neural Conversational Model," International Conference on Machine Learning, 2015, pp. 1-8.

Wallace, "The Anatomy of Alice," In Parsing the Turing Test, Springer, 2009, pp. 181-210.

Weizenbaum et al., "Eliza—A Computer Program for the Study of Natural Language Communication between Man and Machine," Communications of the ACM, 9(1):36-45, 1966.

Welleck et al., "Dialogue Natural Language Inference," arXiv preprint arXiv:1811.00671, 2018, pp. 1-11.

Weston et al., "Memory Networks," International Conference of Learning Representations (ICLR), 2014, pp. 1-15.

Wu et al., "Global-to-local Memory Pointer Networks for Task-Oriented Dialogue," In International Conference on Learning Representations, 2019, pp. 1-19.

Zhang et al., "Personalizing Dialogue Agents: I Have a Dog, Do You Have Pets Too?," arXiv preprint arXiv:1801.07243, 2018, pp. 1-16.

Zhou et al., "The Design and Implementation of Xiaoice, an Empathetic Social Chatbot," arXiv preprint arXiv:1812.08989, 2018, pp. 1-35.

Zhu et al., "Aligning Books and Movies: Towards Story-like Visual Explanations by Watching Movies and Reading Books," IEEE International Conference on Computer Vision, 2015, pp. 1-23.

* cited by examiner

Conversation history
User A: what do you do for work ?
User B: i'm a life coach and i'm good at it
User A: i could use your services .
User B: i'll run right over and help
User A: that is very kind of you .
User B: i run marathons and that is serious business
User A: i work out but it is just to hang with friends

---

KVMEMNet: that is sick i go running a lot
Fluency:       4.80 ± 0.40
Consistency:   2.40 ± 1.50
Engagingness:  3.60 ± 1.36
Preferred by 1 out of 5 raters Sketch-and-Fill: what do you do for a living ?
Fluency:       4.80 ± 0.40
Consistency:   4.40 ± 0.49
Engagingness:  4.00 ± 1.55
Preferred by 3 out of 5 raters

AGENT PERSONA GROUNDED CHIT-CHAT GENERATION FRAMEWORK

PRIORITY APPLICATION DATA

This application claims priority to U.S. Provisional Application No. 62/814,192 filed on Mar. 5, 2019 and entitled "Agent persona grounded chit-chat generation framework", which is incorporated by reference in its entirety.

TECHNICAL FIELD

The disclosure relates generally to a dialogue generating framework implemented as a neural network, and more specifically to the dialogue generating framework that determines a response for a computing agent that converses in an undirected dialogue or chit-chat.

BACKGROUND

Conventionally, when computing agents communicate with each other, each computing agent can access its internal state, but has limited knowledge of internal states of other computing agents. Some computing agents may try to predict or guess internal states of other computing agents.

BRIEF DESCRIPTION OF THE DRAWINGS

FIG. 7 illustrates a comparison between a response from a dialogue generating framework and a response from a key-value memory network, according to some embodiments.

DESCRIPTION

A chit-chat conversation challenges machine learning models to generate fluent natural language for a computing agent to allow the agent to successfully interact with other agents and live users. In contrast to a directed or goal oriented dialogue, such as when a human is booking a flight, a chit-chat conversation is an undirected dialogue that does not have an explicit goal or purpose.

Generating a natural human dialogue between agents executing on multiple computers or between humans and agents, challenges machine learning frameworks to model cohesive text and interactions between agents or humans and agents. When an agent communicates with another agent or with a user, the agent has an internal state that identifies the knowledge and intent of the agent. However, the agent has limited knowledge of the state of other agents or humans. When an agent engages in a natural dialogue, the natural dialogue can be an iterative process in which the agent parses the communication from another agent or a human, infers state, and determines a response that is cohesive and on-topic.

To generate responses in the undirected dialogue, the embodiments below describe a sketch-and-fill framework. The sketch-and-fill framework is a framework that includes one or more neural networks that generate responses for an agent based on the persona traits of an agent and common conversational patterns. Further embodiments of a sketch-and-fill network are discussed below.

Figure 1:
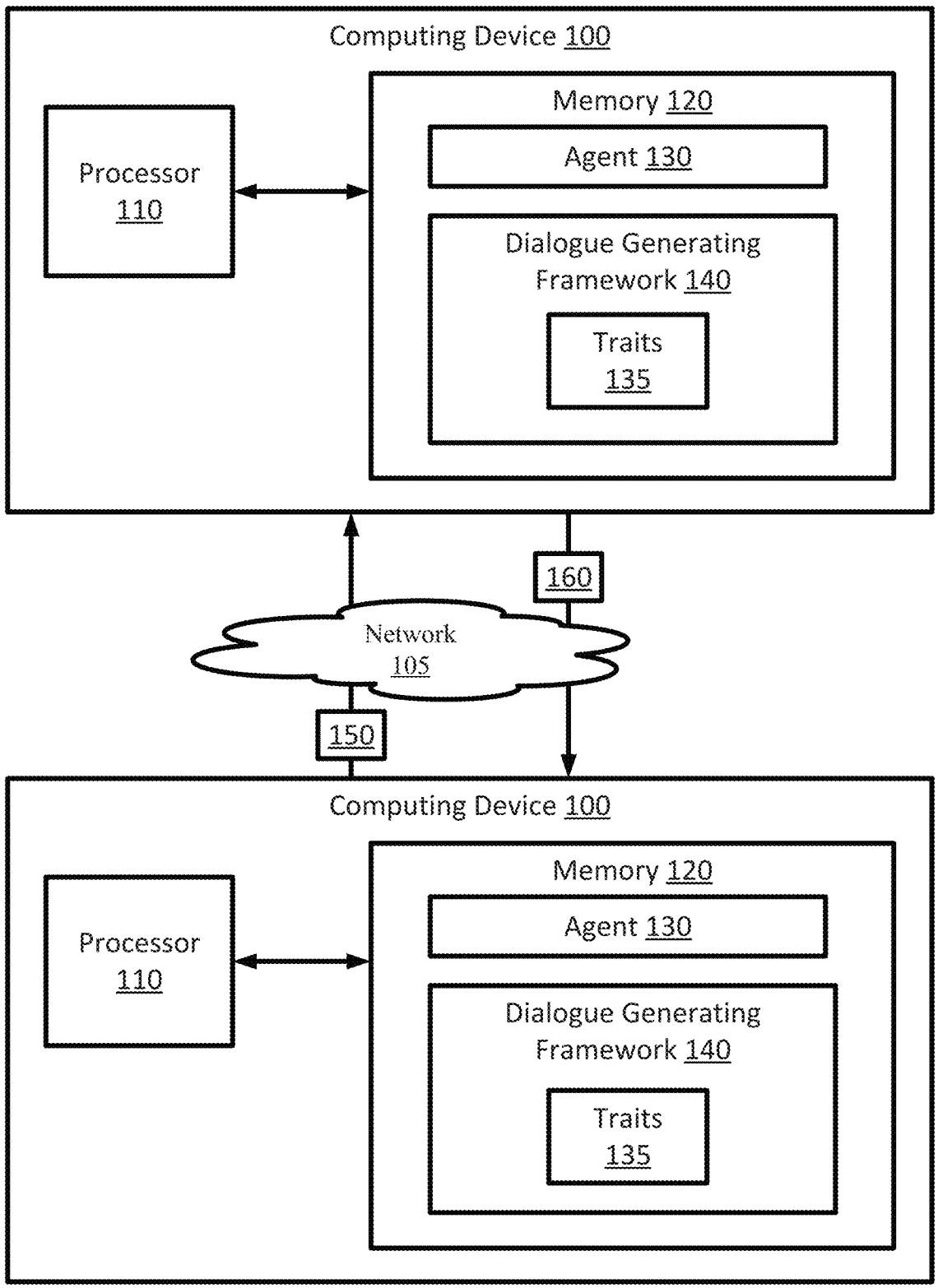
FIG. 1 is a simplified diagram of coupled computing devices, according to some embodiments.

FIG. 1 is a simplified diagram of a coupled computing devices, according to some embodiments. As shown in FIG. 1, computing devices 100 communicate over network 105. Network 105 can be implemented as a single network or a combination of multiple networks. For example, in various embodiments, network 105 may include the Internet or one or more intranets, landline networks, wireless networks, and/or other appropriate types of networks. Network 105 may be a small scale communication network, such as a private or local area network, or a larger scale network, such as a wide area network, accessible by the various computing devices 100.

Computing devices 100 may include a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes an agent 130. Although shown as a single agent 130, memory 120 may include multiple agents. Agent 130 may exchange communications with other agents or humans on the same or a different computing device 100. Agent 130 may also be associated with one or more agent traits 135, that are personal to that agent 130 and define a persona of agent 130. Agent traits 135 may be sentences that were previously generated by agent 130, adopted form another agent or a human user. Agent traits 135 may describe characteristics of agent 130 that emulate characteristics of a human user.

As shown, memory 120 may also include a dialogue generating framework 140. Dialogue generating framework 140 may generate communications, such as sentences or responses that contribute to dialogue between agent 130 and other agents or humans, including chit-chat communications, which are undirected communications that do not have an explicit conversational goal. As shown in FIG. 1, undirected communications may include communication 150 and 160 that are communicated between agents 130 or agent 130 and a human user.

Example dialogue generating framework 140 may be a sketch-and-fill framework. The sketch-and-fill framework may generate a chit-chat dialogue in three phases: a sketch phase, a fill phase, and a rank phase. In the sketch phase, dialogue generating framework 140 may generate sketch sentences that include slots. The sentence with slots allows dialogue generating framework 140 to learn response patterns that are compatible with one or more specific agent traits 135 of agent 130. In the fill phase, dialogue generating framework 140 may fill the slots in the sentences with words selected from agent traits 135 that are associated with agent 130. In the rank phase, dialogue generating framework 140 may rank the sentences with filled slots according to perplexity. To rank the sentences, dialogue generating framework 140 may use a pre-trained language model ("LM") which may ensure that the final sentence selected from the sentences filled with words is the sentence with the lowest perplexity and is a natural response to the undirected conversation.

Figure 2:
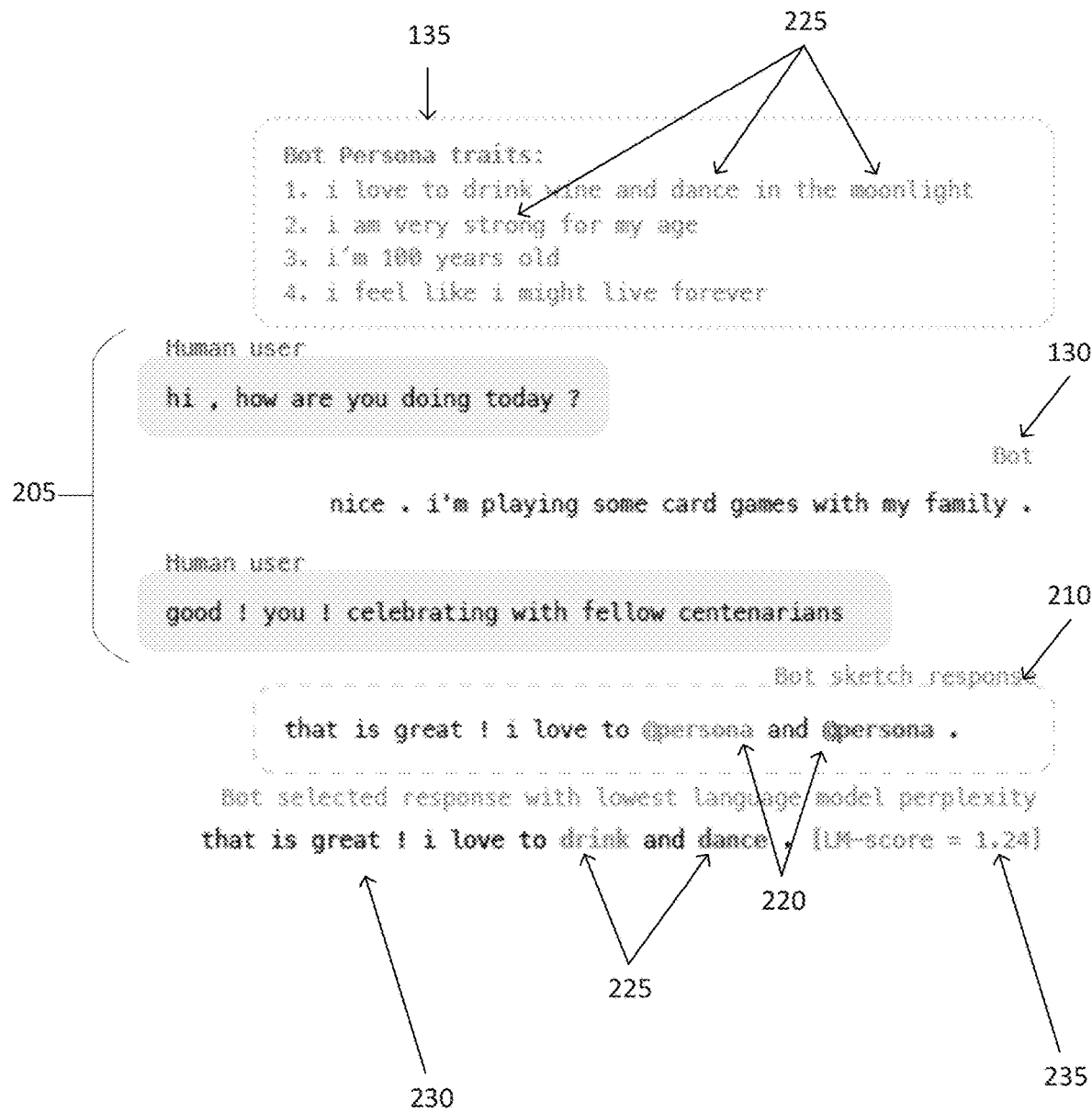
FIG. 2 is a diagram of a chit-chat dialogue generated with a dialogue generating framework, according to some embodiments.

FIG. 2 is a diagram of a chit-chat dialogue between an agent using a dialogue generating framework and a human user, according to some embodiments. FIG. 2 illustrates conversation 205, such as undirected dialogue between a human user and agent 130. FIG. 2 also illustrates agent traits 135 of agent 130 that are accessible to dialogue generating framework 140 and that dialogue generating framework 140 may use to generate a response, such as communication 160 of FIG. 1. Example agent traits 135 in FIG. 2 may be sentences that describe a persona of agent, such as "I love to drink and dance in the moonlight," "I am strong for my age," "I'm 100 years old," and "I feel like I might live forever."

Dialogue generating framework 140 may initially generate a sketch sentence response 210 with slots 220 (designated with a tag @persona in FIG. 2). Dialogue generating framework 140 may fill sketch sentence responses 210 by filling slots 220 with various words 225 selected from agent traits 135. Example words 225 may be "drink," "wine," "dance," "moonlight," "strong," "age," "100," "years," "old," "feel," "might," "live," "forever." This enables dialogue generating framework 140 to learn response patterns compatible with agent traits 135 of agent 130. Subsequently, dialogue generating framework 140 may rank the filled sentence responses using the pre-trained language model which generates a final response 230. Final response 230 may be the response with a lowest perplexity and/or has the lowest LM score 235. As discussed above, the response with lowest perplexity may be a response that is more fluent and natural to conversation 205.

Referring back to FIG. 1, dialogue generating framework 140 may generate human-like chit chat responses for agent 130 that are conditioned on persona relevant information, such as agent traits 135 of agent 130. For example, dialogue generating framework 140 may decompose a chit-chat dialogue into common conversational patterns coupled with insertions of agent-specific information, such as words 225 of FIG. 2. Dialogue generating framework 140 may also generate sketches that capture conversational patterns and insert persona-relevant information of agent 130.

Dialogue generating framework 140 may receive a vector of words x at time t, which may be denoted as $x_t$ and generate an output vector of words y for time t, which may be denoted as $y_t$. Further, dialogue generating framework 140 may denote a vector of words $x_t$ that are included in a conversation, such as a chit-chat dialogue, by $x_t^c$, and vector of words $x_t$ that are included in agent traits 135 by $x_t^p$. Further, the input and output words, $x_t, y_t \in \{0, 1\}^d$ may be 1-hot vectors, where d denotes the size of a vocabulary. In some embodiments, the vocabulary may be composed of unique words, punctuation, and special symbols. Dialogue generating framework 140 may also denote $x_{0:T}$ as a sequence of $(x_0, \ldots, x_T)$.

In some embodiments, dialogue generating framework 140 may be structured as a neural network or a combination of multiple neural networks. Dialogue generating framework 140 may use a response generation model that predicts words $y_t$ by modeling a probability distribution $P(y_{0:T}|x_{0:T}; \theta)$ over a sequence of d words, where T is the input sequence and $\theta$ are the model weights. The predicted words $y_{0:T}$ form sketch sentence response 210.

Figure 3:
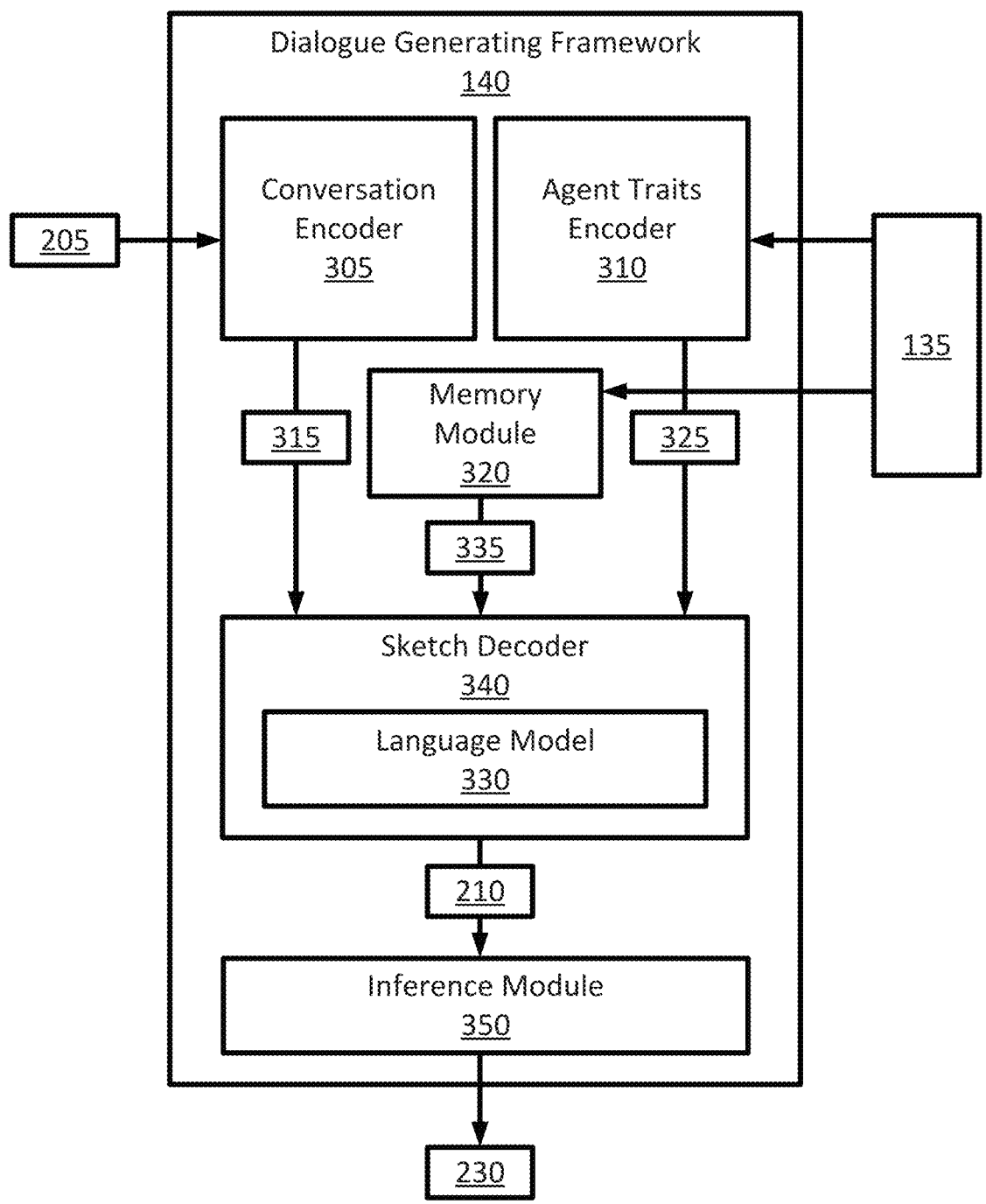
FIG. 3 is a block diagram of a dialogue generating framework, according to some embodiments.

FIG. 3 is a block diagram of dialogue generating framework 140, according to some embodiments. As illustrated in FIG. 3, dialogue generating framework 140 may receive agent traits 135 and conversation 205.

In some embodiments, dialogue generating framework 140 may include a conversation encoder 305, a persona encoder 310, a memory module 320, a language model 330, and a sketch decoder 340.

In some embodiments, conversation encoder 305 and persona encoder 310 may be recurrent neural networks, such as LSTM (long short term memories), but are not limited to that embodiment. Conversation encoder 305 and persona encoder 310 may compute hidden representation $e_t$ of the input, such as $h_{0:T}^e = \text{Enc}(x_{0:T}; \theta)$. For example, conversation encoder 305 and persona encoder 310 may compute a sequence of hidden states $h_{0:T}$ auto-regressively, as follows:

$$h_{t+1}^e = \text{LSTM}(x_t, h_t^e; \theta) \qquad \text{Equation (1)}$$

where raw input tokens $x_t$ at time t, $h_t^e$ is a hidden state determined by the encoder at time t, and $h_{t+1}^e$ is a hidden state determined by the encoder at time t+1, and $\theta$ is a parameter(s) internal to the encoder.

In case of conversation encoder 305, raw input tokens $x_t$ may be conversation 205 (designated as conversational history $x_{0:T}^c$). Conversation encoder 305 may pass conversation 205 through the neural network to auto-regressively encode conversation hidden states $x_{0:T}^{e,c}$ (also referred to as $x_T^c$), shown as 315 in FIG. 3. In case of persona encoder 310, raw input tokens $x_t$ may be agent traits 135 (designated as persona history $x_{0:T}^p$). Persona encoder 310 may pass agent traits 135 through the neural network to auto-regressively encode persona hidden states $x_{0:T}^{e,p}$ (also referred to as $x_T^p$), shown as 325 in FIG. 3.

In some embodiments, memory module 320, designated as $m_{0:T} = \text{Mem}(x_{0:T}; \theta)$, may select and store a subset of words from agent traits 135 of agent 130. The subset of words may be rare words constructed by filtering out words, such as stop words, punctuation, and other symbols from agent traits 135, and are shown as words 225 in FIG. 2. Stop words may be articles, pronouns, and other words that memory module 320 may be configured to treat as stop words. For example, with reference to FIG. 2, agent 135 may have agent trait in agent traits 135 that is "I love to drink wine and dance in the moonlight." From this agent trait, memory module 320 may select words 225 that are "drink" and "dance." The subset of words may be designated as embeddings $e(x_i^p)$ and stored in memory module 320 or memory 120 accessible to agent 130. Further, the i in $e(x_i^p)$ may be an index for the selected words 225, and such that memory module 320 may use index i to access some or all words 225.

In some embodiments, memory module 320 may also be a neural network.

After conversation encoder 305 encodes conversation 205, memory module 320 may generate a memory readout m (shown as 335 in FIG. 3). Memory module 320 may generate memory readout m using the conversation encoder hidden state $h_T^c$ and embeddings from the subset of words $e(x_i^p)$, as follows:

$$m = \Sigma_i w_i(h_T^c) e(x_i^p) \quad \text{Equation (2)}$$

$$w_i(h_T^c) = \sigma(W^m h_T^c + b^m)i \quad \text{Equation (3)}$$

where i is a vector index over the persona-memory, $W^m$ is a matrix of weights and $b^m$ is a vector of biases and $\sigma(x)_j = e^{x_j}/\Sigma_i e^{x_i}$ is a softmax activation function.

In some embodiments, sketch decoder 240, designated as $h_{0:T}^d = \text{Dec}(h_{0:T}^e, m_{0:T}; \theta)$, may synthesize both the encoded input and memory readouts, and compute a distribution $P(\hat{y}_t|x_{0:T}, \hat{y}_{0:t-1}) = \text{softmax}(W^{dec} h_t^d = b^{dec})$ that predicts a sketch sentence response 210 of agent 130. For example, sketch decoder 240 may receive conversation hidden states $h_{0:T}^{e,c}$ (315), persona hidden states $h_{0:T}^{e,p}$ (325), and memory readout m (315) and generate one or more sketch sentence responses 210 with slots 220 designated using @persona tags.

Sketch decoder 340 may be recurrent neural networks, such as an LSTM networks in non-limiting embodiments.

In some embodiments, sketch decoder 240 may generate sketch sentence responses 210 word for word. To generate sketch sentence responses, sketch decoder 240 may recursively compute decoder hidden states $h_t^d$, as follows:

$$h_t^d = \text{LSTM}(y_{t-1}, h_{t-1}^d, a_t^e, a_t^p; \theta) \quad \text{Equation (4)}$$

where $y_{t-1}$ is a word that sketch decoder 240 previously generated for sketch sentence response 210, $h_{t-1}^d$ is a previous hidden state, $a_t^e$ is an attention vector over conversation hidden states $h_{0:T}^{e,c}$, and $a_t^p$ is an attention vector over persona hidden states $h_{0:T}^{e,p}$, and $\theta$ is a parameter(s) internal to sketch decoder 240. The attention vectors $a_t^e$ and $a_t^p$ are determined as further discussed below.

In some embodiments, sketch decoder 240 may determine initial hidden state $h_0^d$. The initial decoder hidden state hg may be decoder hidden state lid $h_{t-1}^d$ during the first recursive iteration in Equation 4. Sketch decoder 240 may determine initial hidden state $h_0^d$ as follows:

$$h_0^d = f(W^{dm}[h_T^e, m] + b^{dm}) \quad \text{Equation (5)}$$

where $f$ is a non-linear activation function, $W^{dm}$ is a matrix of weights, $b^{dm}$ is a vector of biases, m is memory readout 315 and $h_T^e$ are conversation hidden states $h_{0:T}^{e,c}$ and/or persona hidden states $h_{0:T}^{e,p}$.

In some embodiments, sketch decoder 340 may include language model 330. Language model 330, designated as $P^{LM}(x_{t+1}|(x_{0:t};\theta)$, may compute a distribution over the next word in sketch sentence response 210. Once sketch decoder 340 computes decoder hidden states $h_t^d$ at time t, sketch decoder 340 may map decoder hidden states $h_t^d$ at time t into a distribution over output words in a language model 330 to determine a word $y_t$ in sketch sentence response 210, as follows:

$$P(y_t|x_{0:T}, y_{0:t-1}) = \sigma(W^{dec}[h_t^d, y_{t-1}] + b^{dec}) \quad \text{Equation (6)}$$

where $\sigma(x)_j = e^{x_j}/\Sigma_i e^{x_i}$ is the softmax activation function, $W^{dec}$ is a matrix of weights, $b^{dec}$ is a vector of biases, $h_t^d$ are the hidden states at time t, and $y_{t-1}$ is a word that sketch decoder 340 predicted for sketch sentence response 210 at time t-1. Sketch decoder 340 may repeat the above process recursively from time t=0 to time t=N, at which time sketch decoder 340 may generate sketch sentence response 210.

Referring back to attention vectors $a_t^e$, such $a_t^c$ at which is an attention vector over conversation hidden states $h_{0:T}^{e,c}$, and $a_t^p$ which is an attention vector over persona hidden states $h_{0:T}^{e,p}$ discussed with respect to Equation (4), sketch decoder 340 may determine attention vectors $a_t^e$ via normalized attention weights w, as follows:

$$a_t(y_p, h_t^d, h_{0:T}) = \Sigma_{u=0}^U w_{u,t}(y_{t-1}, h_{t-1}^d, h_{0:T}) h_u \quad \text{Equation (7)}$$

$$w_{u,t} = \sigma(\langle W^a[y_{t-1}, h_{t-1}^d, h_u] + b^a, h_u \rangle) \quad \text{Equation (8)}$$

where u is the encoder timestep and $\sigma(x)_j = e^{x_j}/\Sigma_i e^{x_i}$ is the softmax activation function, $W^a$ is a matrix of weights, $b^a$ is a vector of biases, $y_{t-1}$ is a word that sketch decoder 340 predicted for sketch sentence response 210 at time t-1, $h_{t-1}^d$ are the decoder hidden states at time t-1, and $h_u$ may be an input line received by sketch decoder 340 having length from u=0 to u=U. Further, hidden states $h_{0:T}$ may be conversation hidden states $h_{0:T}^{e,c}$ when Equation (7) determines conversation attention vector $a_t^p$, and persona hidden states $h_{0:T}^{e,p}$ when Equation (7) determines persona attention vector $a_t^p$. Also, the matrix of weights $W^a$ may have different values when Equation 7 is used to determine conversation attention vector $a_t^c$ and persona attention vector $a_t^p$. In Equation 8 the softmax may be taken over the encoder timestep dimension and $\langle ., . \rangle$ may be an inner product.

Figure 4:
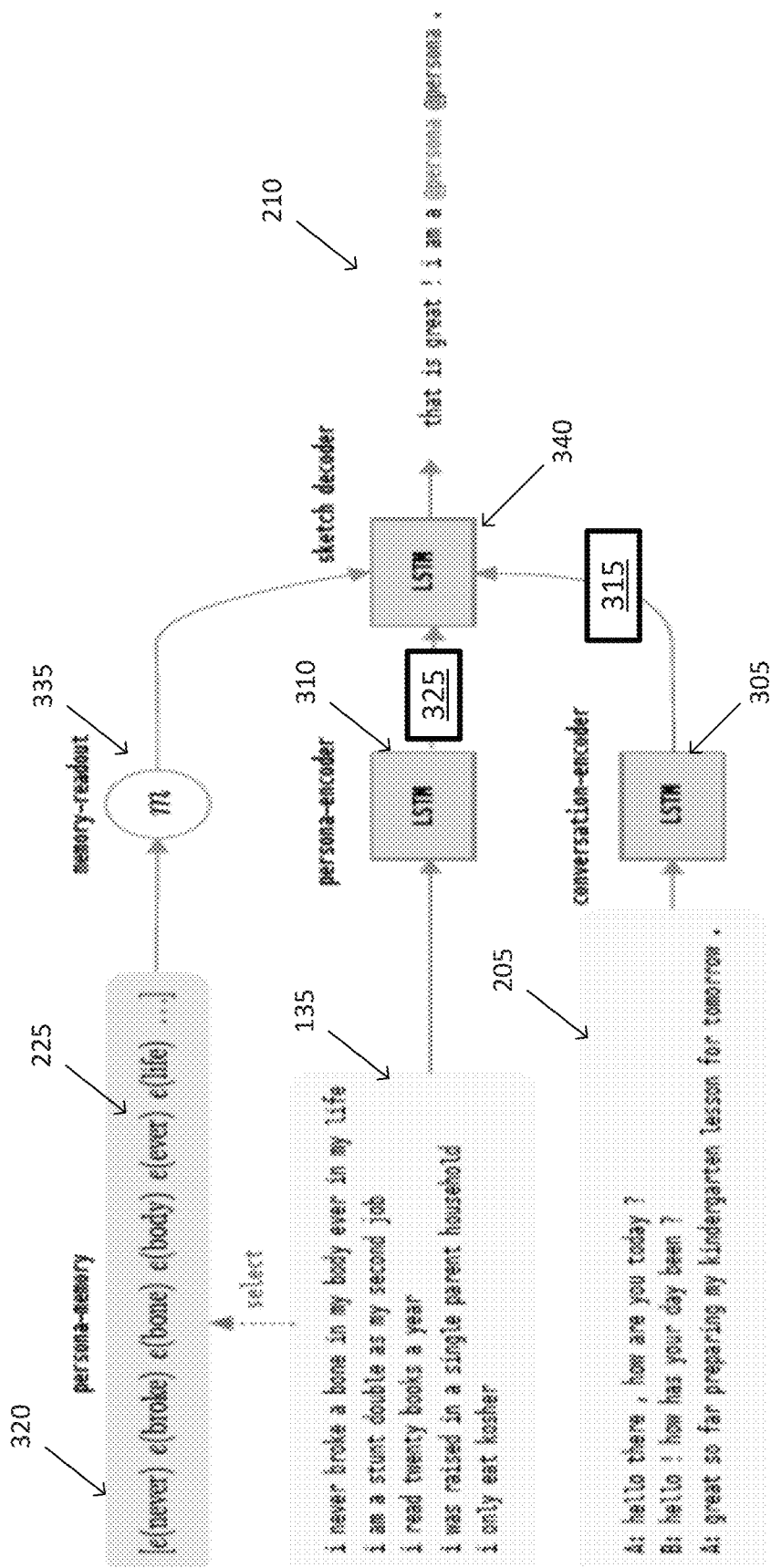
FIG. 4 is a block diagram of dialogue generating framework generating a sketch sentence response, according to some embodiments.

FIG. 4 is a block diagram of dialogue generating framework generating a sketch sentence response, according to some embodiments. As shown in FIG. 4, conversation encoder 305 encodes conversation 205 into conversation hidden states $h_{0:T}^{e,c}$ (315) and persona encoder 310 encodes agent traits 135 into persona hidden states $h_{0:T}^{e,p}$ (325). As also shown in FIG. 4, memory module 320 selects words 225 from agent traits 135 and may store word embeddings for the words 225 in persona memory of memory module 320. Additionally, memory module 320 uses encoded conversation hidden states $h_T^{e,c}$ and word embeddings to generate a read-out vector m (335).

As shown in FIG. 4, sketch decoder 340 may receive conversation hidden states $h_{0:T}^{e,c}$ (315), persona hidden states $h_{0:T}^{e,p}$ (325) and memory readout m (315) and generate sketch sentence response 210 word by word. As illustrated in FIG. 4, sketch sentence response 210 may include one or more slots, designated as @persona tags that may be filled in with words 225, as discussed below.

Referring back to FIG. 3, in some embodiments, dialogue generating framework 140 may include an inference module 350. Inference module 350 may train sketch sentence response 210 which are an output of sketch decoder 340 by minimizing cross-entropy loss with ground truths $y^*_t$. Further, inference module 350 may use an iterative, generate-and-score approach to produce final response 230. In the generate-and-score approach, inference module 350 may first perform a beam search with beam size B to generate B sketch responses $\{\hat{y}_{0:T^b}^b\}_{b=1,\ldots,B}$ from sketch sentence response 210 that contain slots 220 shown as @persona tags.

Next, inference module 350 may fill in slots 220 in the selected sentence responses with words 225. For example, for each of the B sketch responses, inference module 350 may select words 225 from agent traits 135 of agent 130 with the highest attention weight $w_{i*}(h_T^c)$, and generate B' sentence responses by filling each slot 220 that has an @persona tag with words 225. The B' candidate responses are filled sentence responses.

In some embodiments, inference module 350 may select final response 230 from B' candidate responses. To select final response 230, inference module 350 may compute the perplexity $s_b$ of all B' candidate responses using a language model:

$$s_k = \exp\frac{1}{T^b}\sum_{t=0}^{T^b} -\log P^{LM}(y_t^b \mid y_{0:t-1}^b)$$

Equation (9)

where $s_k$ is a perplexity of each candidate response from k=0 to B'.

The language model may be a pretrained language model. In some embodiments, final response 230 may be a response $b^* = \min_b s_b$, which is a response with the lowest LM-likelihood score, which is the response with a lowest perplexity.

Figure 5:
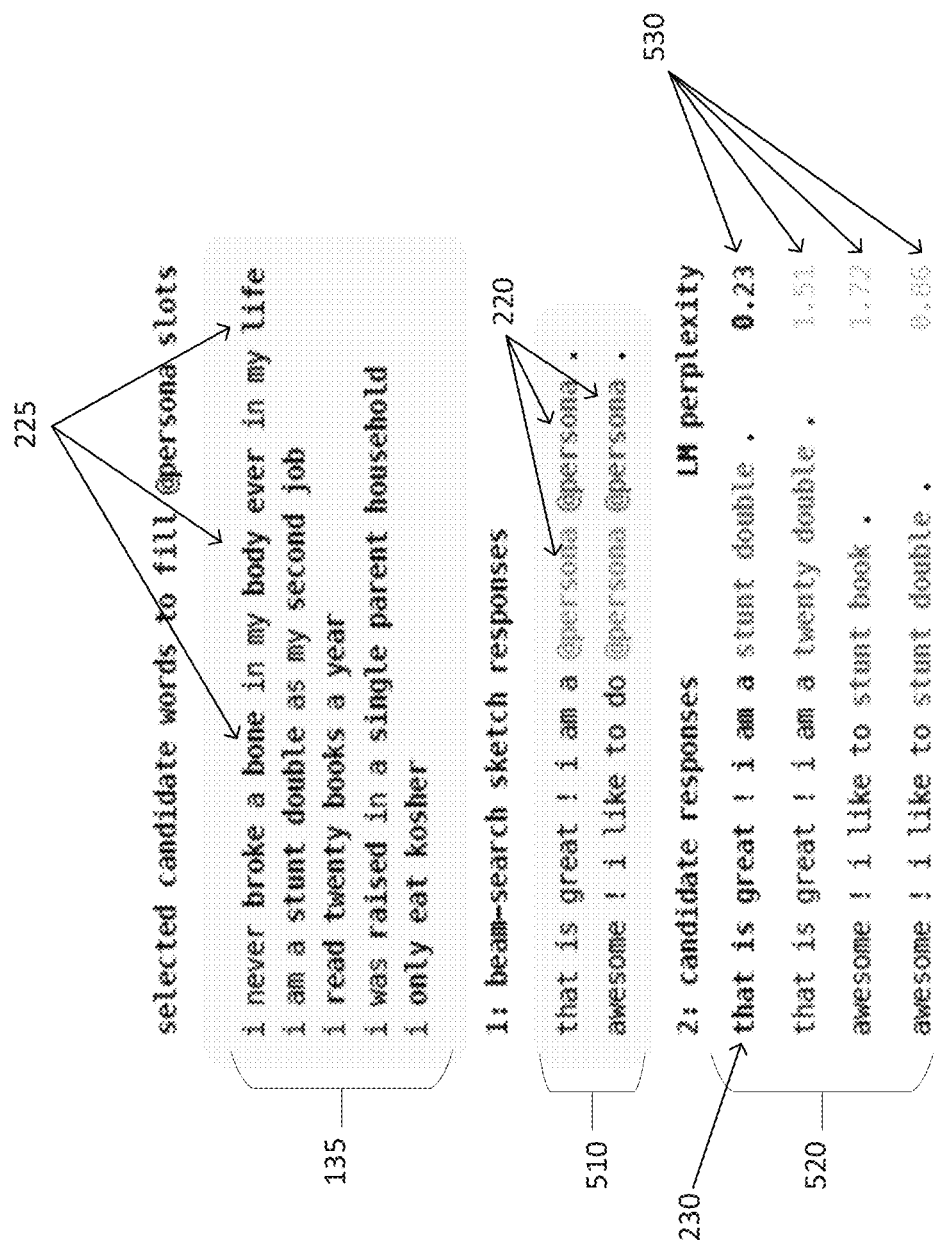
FIG. 5 is a diagram of dialogue generating framework generating a response with an inference strategy, according to some embodiments.

FIG. 5 is a diagram of a dialogue generating framework generating a final response using an inference strategy, according to some embodiments. As illustrated in FIG. 5, sketch decoder 340 may generate one or more sketch sentence responses 210 from which inference module 350 may select two sketch sentence responses 510 because B=2. Notably, B may be a configurable number and may not always be two. Next, inference module 350 may generate B' candidate responses 520 by selecting words 225 from agent traits 135 and filling slots 220 with @persona tags in each sketch sentence response 510 with words 225. Once, inference module 350 selects B' sentence responses 520, inference module 350 may pass B' sentence responses 520 through a language model as shown in Equation 9 to determine perplexities 530 of each one of the B' sentence responses 520. Next, inference module 350 may select final response 230 which is a response from B' sentence responses 520 with the lowest-perplexity.

Figure 6:
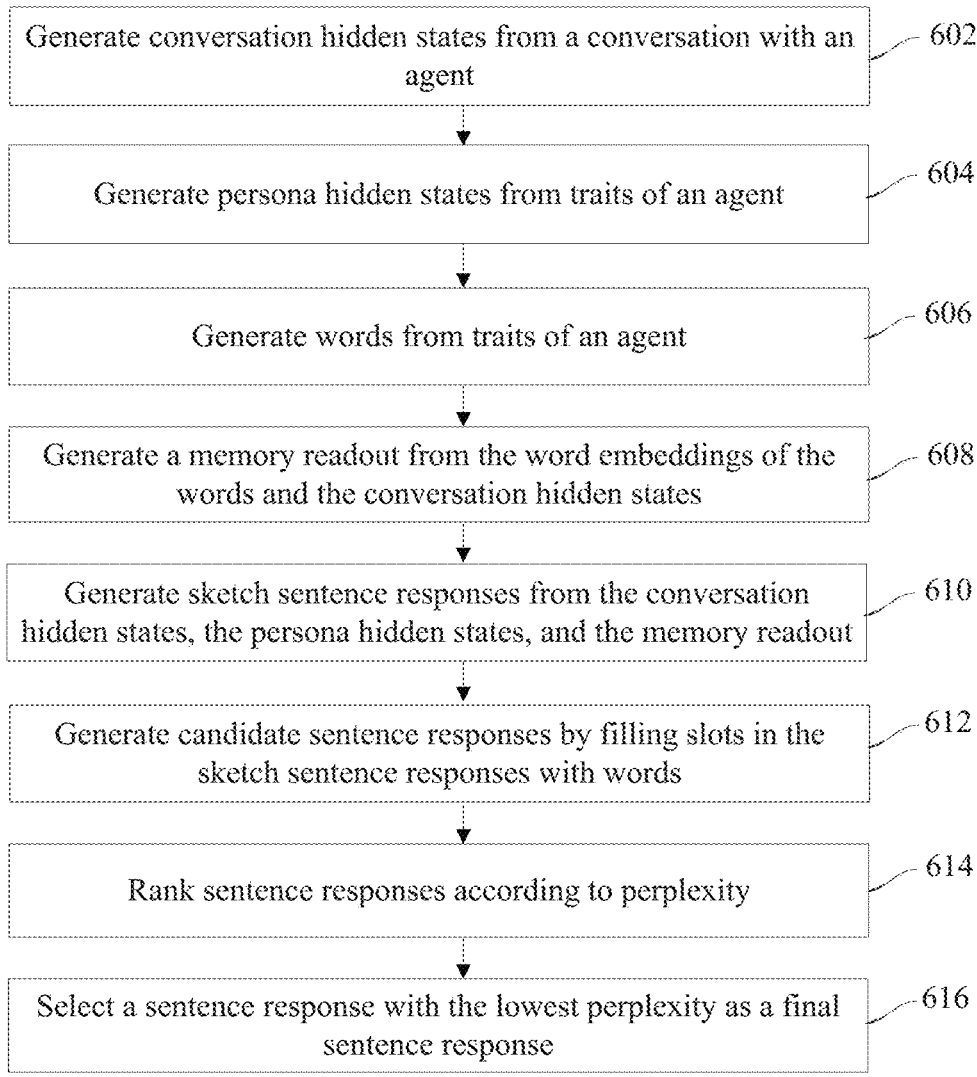
FIG. 6 is a flowchart of a method for generating a response using a dialogue generating framework, according to some embodiments.

FIG. 6 is a flowchart of a method 600 for generating a response using a dialogue generating framework, according to some embodiments. Method 600 may be performed by executable code or instructions that are stored in memory 120 and are executed by processor 110 of FIG. 1.

At operation 602, conversation hidden states are generated. For example, conversation encoder 305 may encode conversation 205 into conversation hidden states $x_{0:T}^{e,c}$ (shown as 315 in FIG. 3).

At operation 604, persona hidden states are generated. For example, persona encoder 310 may encode agent traits 135 into persona hidden states $x_{0:T}^{e,p}$ (shown as 325 in FIG. 3).

At operation 606, words are generated from agent traits. For example, memory module 320 may select words 225 from agent traits 135 and store the word embeddings for the selected words 225.

At operation 608, a memory readout is generated from the word embeddings and conversation hidden states. For example, memory module 320 may generate memory readout 335 based on conversation hidden states $x_{0:T}^{e,c}$ and word embeddings. As discussed above, memory readout 335 may include a subset of words 225.

At operation 610, sketch sentence responses are generated from conversation hidden states, persona hidden states, and a memory readout. For example, sketch decoder 340 may generate one or more sketch sentence responses 210 from conversation hidden states $x_{0:T}^{e,c}$ (315), persona hidden states $x_{0:T}^{e,p}$ (325), and memory readout m (335). As discussed above, sketch decoder 340 may then map the determined hidden state $h_t^d$ into a distribution in language model 330 to determine a word in sketch sentence responses 210. Sketch decoder 240 may iteratively repeat the above processes for each word until sketch decoder 340 generates one or more sketch sentence responses 210 word by word. As also discussed above, sketch sentence responses 210 may include slots 220 designated using a tag, such as an @persona tag.

At operation 612, candidate sentence responses are generated from the sketch sentence responses. For example, inference module 350 may generate one or more sentence responses 520 by filling slots designated with the @persona tag in sketch sentence responses 210 with words 225.

At operation 614, sentence responses are ranked. For example, inference module 350 may rank the one or more sentence responses 520 according to perplexity by passing sentence responses 520 through a language model, such as Equation (9).

At operation 616, a final sentence is selected from the sketch sentence responses. For example, inference module 350 may select final response 230 to be included in conversation 205 as response from agent 130 from sentence responses 520. As discussed above, final response 230 may be a sentence with lowest perplexity as determined by the language model.

In some embodiments, final response 230 generated by dialogue generating framework 140 generates may be compared against a response generated by conventional frameworks, such as a key-value memory network (KVMEMNet). The comparison may be based on fluency, consistency, and engagingness. Fluency may be whether responses are grammatically correct and sound natural. Consistency may be whether responses do not contradict the previous conversation. Engagingness may be how well responses fit the previous conversation and how likely the conversation would continue. In some embodiments, human users may perform the comparison.

FIG. 7 illustrates results of a comparison between dialogue generating framework and KVMEMNet, according to some embodiments. FIG. 7 illustrates conversation 205 between user A and user B, where user B may be agent 130. FIG. 7 also illustrates KVMEMNet response 710 generated using KVMEMNet and final response 230 generated using dialogue generating framework 140. As illustrated in FIG. 7, final response 230 has a higher consistency and engagingness than response 720. As also illustrated in FIG. 7, three out of five users prefer final response 230 to KVMEMNet response 710.

Referring back to FIG. 1, in some examples, memory 120 may include non-transitory, tangible, machine readable media that includes executable code that when run by one or more processors (e.g., processor 110) may cause the one or more processors to perform the methods described in further detail herein. In some examples, dialogue generating framework 140 may be implemented using hardware, software, and/or a combination of hardware and software.

Some examples of computing devices, such as computing device 100 may include non-transitory, tangible, machine readable media that include executable code that when run by one or more processors (e.g., processor 110) may cause the one or more processors to perform the processes of the methods and equations described herein. Some common forms of machine readable media that may include the processes of the methods and equations are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for determining a final response for an agent in an undirected dialogue, the system comprising:
    a dialogue generating framework stored in memory and configured to execute using a processor, the dialogue generating framework configured:
    generate a sketch sentence response in the undirected dialogue with a slot for capturing a conversational pattern in the undirected dialogue, wherein to generate the sketch response sentence the dialogue generating framework is further configured to:
        generate, using a first encoder, conversation hidden states from the undirected dialogue;
        generate, using a second encoder, agent traits hidden states from the traits of the agent;
        select words from the traits of the agent;
        generate a memory readout from the words and the conversation hidden states; and
        generate, using a sketch decoder, words in the sketch sentence response using the conversation hidden states, the agent traits hidden states, and the memory readout;
    fill the slot in the sketch sentence response with at least one word from the words selected from traits of the agent; and
    generate the final response by selecting from a plurality of sketch sentence responses, each having a perplexity, a filled sketch sentence response with a lowest perplexity.

2. The system of claim 1, wherein to generate the sketch response sentence, the dialogue generating framework is configured to analyze the undirected dialogue, the traits of the agent, and words included in the traits.

3. The system of claim 1, wherein to generate the words in the sketch sentence response, the dialogue generating framework is further configured to:
    generate a decoder hidden state using a previous word in the words, a previous decoder hidden state, a conversation attention vector over the conversation hidden states and an agent traits attention vector over the agent traits hidden states; and
    determine a word in the words by mapping the decoder hidden state and the previous word into a distribution in a language model.

4. The system of claim 3, wherein the dialogue generating framework is further configured to determine the conversation attention vector using the previous word, the previous decoder hidden state, and the conversation hidden states.

5. The system of claim 3, wherein the dialogue generating framework further configured to determine the agent traits attention vector using the previous word, the previous decoder hidden state, and the agent traits hidden states.

6. The system of claim 3, wherein the dialogue generating framework further configured to determine an initial decoder hidden state using the memory readout, the conversation hidden states, and the agent traits hidden states.

7. The system of claim 6, wherein the initial decoder hidden state is the previous decoder hidden state during a next iteration of the dialogue generating framework that is configured to determine the word.

8. A method for determining a final response for an agent in an undirected dialogue, the method comprising:
    generating, using a dialogue generating framework stored in a memory and executing on a processor, a sketch sentence response in the undirected dialogue with a slot for capturing a conversational pattern in the undirected dialogue, wherein the generating further comprises:
        generating, using a first encoder of the dialogue generating framework, conversation hidden states from the undirected dialogue;
        generating, using a second encoder of the dialogue generating framework, agent traits hidden states from the traits of the agent;
        selecting words from the traits of the agent;
        generating a memory readout from the words and the conversation hidden states; and
        generating, using a decoder of the dialogue generating framework, words in the sketch sentence response using the conversation hidden states, the agent traits hidden states, and the memory readout;
    filling the slot in the sketch sentence response with at least one word from the words selected from traits of the agent;
    determining, using a neural network language model, perplexity for the filled sketch sentence response; and
    generating a final response by selecting from a plurality of sketch sentence responses, each having a perplexity, the filled sketch sentence response with a lowest perplexity.

9. The method of claim 8, wherein generating the sketch response sentence comprises:
analyzing the undirected dialogue, the traits of the agent, and the words included in the traits.

10. The method of claim 8, wherein generating the words in the sketch sentence response comprises:
generating a decoder hidden state using a previous word in the words, a previous decoder hidden state, a conversation attention vector over the conversation hidden states, and an agent traits attention vector over the agent traits hidden states; and
determining a word in the words by mapping the decoder hidden state and the previous word into a distribution in a language model.

11. The method of claim 10, further comprising:
determining the conversation attention vector using the previous word, the previous decoder hidden state, and the conversation hidden states.

12. The method of claim 10, further comprising:
determining the agent traits attention vector using the previous word, the previous decoder hidden state, and the agent traits hidden states.

13. The method of claim 10, further comprising:
determining an initial decoder hidden state using the memory readout, the conversation hidden states, and the agent traits hidden states.

14. The method of claim 13, wherein the initial decoder hidden state is the previous decoder hidden state during a next iteration of the dialogue generating framework that determines the word.

15. A non-transitory machine-readable medium having stored thereon machine-readable instructions executable to cause a machine to perform operations that determine a final answer for an agent in an undirected dialogue, the operations comprising:
generating, using a dialogue generating framework, a sketch sentence response in the undirected dialogue with a slot for capturing a conversational pattern in the undirected dialogue, wherein the generating further comprises
generating, using a first encoder of the dialogue generating framework, conversation hidden states from the undirected dialogue;
generating, using a second encoder of the dialogue generating framework, agent traits hidden states from the traits of the agent;
selecting words from the traits of the agent;
generating a memory readout from the words and the conversation hidden states; and
generating, using a decoder of the dialogue generating framework, words in the sketch sentence response using the conversation hidden states, the agent traits hidden states, and the memory readout;
filling the slot in the sketch sentence response with at least one word from the words selected from traits of the agent;
determining, using a neural network language model, perplexity for the filled sketch sentence response; and
generating a final response by selecting from a plurality of sketch sentence responses, each having a perplexity, the filled sketch sentence response with a lowest perplexity.

16. The non-transitory machine-readable medium of claim 15, wherein generating the words in the sketch sentence response comprises:
generating a decoder hidden state using a previous word in the words, a previous decoder hidden state, a conversation attention vector over the conversation hidden states and an agent traits attention vector over the agent traits hidden states; and
determining a word in the words by mapping the decoder hidden state and the previous word into a distribution in a language model.

17. The non-transitory machine-readable medium of claim 16, wherein the operations further comprise:
determining an initial decoder hidden state using the memory readout, the conversation hidden states, and the agent traits hidden states, wherein the initial decoder hidden state is the previous decoder hidden state during a next iteration that determines the word.

18. The non-transitory machine-readable medium of claim 16, further comprising:
determining, using the dialogue generating framework, the agent traits attention vector using the previous word, the previous decoder hidden state, and the agent traits hidden states.

19. The non-transitory machine-readable medium of claim 16, further comprising:
determining, using the dialogue generating framework, an initial decoder hidden state using the memory readout, the conversation hidden states, and the agent traits hidden states.

20. The non-transitory machine-readable medium of claim 19, wherein the initial decoder hidden state is the previous decoder hidden state during a next iteration of the dialogue generating framework that is configured to determine the word.

* * * * *